(12) United States Patent
Liu et al.

(10) Patent No.: US 8,917,148 B2
(45) Date of Patent: Dec. 23, 2014

(54) TRANSMISSION UNIT WITH REDUCED CROSSTALK SIGNAL

(75) Inventors: Da-Yu Liu, New Taipei (TW); Da-Yung Liu, New Taipei (TW); Teng-Lan Liu, New Taipei (TW); Ben-Hwa Jang, New Taipei (TW)

(73) Assignee: Yes Way Enterprise Corporation, New Taipei (TW)

( * ) Notice: Subject to any disclaimer, the term of this patent is extended or adjusted under 35 U.S.C. 154(b) by 560 days.

(21) Appl. No.: 13/182,705

(22) Filed: Jul. 14, 2011

(65) Prior Publication Data

US 2013/0015922 A1 Jan. 17, 2013

(51) Int. Cl.
*H04B 3/28* (2006.01)

(52) U.S. Cl.
CPC ........................................ *H04B 3/28* (2013.01)
USPC .......................... 333/12; 333/1; 333/4; 333/5

(58) Field of Classification Search
CPC ................................... H04B 3/28; H01B 7/02
USPC .................................. 333/1, 4, 5, 12
See application file for complete search history.

(56) References Cited

U.S. PATENT DOCUMENTS

| | | | | |
|---|---|---|---|---|
| 4,798,918 A | * | 1/1989 | Kabadi et al. | 174/36 |
| 6,215,071 B1 | * | 4/2001 | Kasahara et al. | 174/117 F |
| 7,709,741 B2 | * | 5/2010 | Reichert et al. | 174/117 F |

FOREIGN PATENT DOCUMENTS

DE          3515724 C2 *   8/1993

* cited by examiner

*Primary Examiner* — Benny Lee
*Assistant Examiner* — Jorge Salazar, Jr.
(74) *Attorney, Agent, or Firm* — C. G. Mersereau; Nikolai & Mersereau, P.A.

(57) ABSTRACT

A transmission unit with reduced crosstalk signal includes a first conductor group having at least one first conductor surrounded by a first sheath and at least one second conductor surrounded by a second sheath. The first and the second conductor are axially arranged corresponding to one another. The first sheath has a dielectric coefficient higher than that of the second sheath, so that a difference in dielectric property exists between the first and the second conductor to enable reduction of crosstalk occurred during high-speed signal transmission over the transmission unit.

5 Claims, 14 Drawing Sheets

TRANSMISSION UNIT WITH REDUCED CROSSTALK SIGNAL

FIELD OF THE INVENTION

The present invention relates to a transmission unit, and more particularly to a transmission unit that includes conductors surrounded by sheaths of different dielectric coefficients, so that a difference in dielectric property exists between the conductors to enable reduction of crosstalk occurred during high-speed signal transmission over the transmission unit.

BACKGROUND OF THE INVENTION

In recent years, the applications of audio and video signals have been constantly widened and improved. For example, video compact disk (VCD), digital versatile disk (DVD), high-definition digital television (HDTV), video call and video conference all have been introduced into people's daily life. Most of the currently available audio video (AV) systems process voice and image information in a completely digitalized manner to meet the newest technological trend. Different specifications and standards for AV systems have been constantly established, revised and updated, so that the AV systems can provide audio and visual signals with higher quality and can be applied to more different application fields to meet consumers' demands. Digital signals must be transmitted at further increased speed without the need of compression. Currently, there are many standardized digital video interfaces available for use, such as HDMI (high-definition multimedia interface), DVI (digital visual interface) and DisplayPort. Through digitized transmission of signals via these interfaces, images of enhanced quality can be displayed on electronic devices. The above-mentioned interfaces can be electrically connected to an adapter, a set-top box, a DVD player, a personal computer, a video game console, an integrated amplifier, a digital stereo system, etc. to enable long distance transmission of high quality signals at high speed, and are therefore widely welcome among consumers and can be seen everywhere now. The use of these standardized digital video interfaces to transmit video signals at high speed can provide better visual effect.

Most cables for DisplayPort connector, DVI connector and HDMI connector are round cables or flat cables. Inside these cables, there is a plurality of metal conductors, which are respectively surrounded by an insulating layer to prevent short circuit between the metal signal conductors. Each signal pair is further surrounded by a metal shield to prevent crosstalk between the signal pair. While the metal shield can reduce the crosstalk between the signal pair, it makes the whole cable stiff, heavy and inconvenient for use. Further, to connect the cable to the terminals of the connector, it is necessary to strip a length of the metal shield from the signal pair. By doing this, scraps would be produced. Moreover, cables with conductors surrounded by metal shields could not be used with piercing terminals to enable automated assembling of cables.

SUMMARY OF THE INVENTION

It is therefore a primary object of the present invention to provide a transmission unit that can reduce crosstalk occurred during high-speed signal transmission over the transmission unit.

To achieve the above and other object, the transmission unit with reduced crosstalk signal according to the present invention includes a first conductor group, which includes at least one first conductor surrounded by a first sheath and at least one second conductor surrounded by a second sheath. The first and the second conductor are axially arranged corresponding to one another. The first sheath has a dielectric coefficient higher than that of the second sheath.

In the present invention, there is a dielectric difference between the first sheath and the second sheath. When the first conductor is surrounded by the first sheath made of a high-dielectric material, the first conductor would have higher dielectric coefficient than the second conductor. In other words, when the first sheath has a high dielectric coefficient, the first conductor surrounded by the first sheath would correspondingly have a high dielectric coefficient. Since the high-dielectric coefficient material has good ability of concentrating electric field to enable easy storage of electric field energy, the transmission unit including the first conductor surrounded by the high-dielectric first sheath can reduce the crosstalk occurred during high-speed signal transmission over the transmission unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
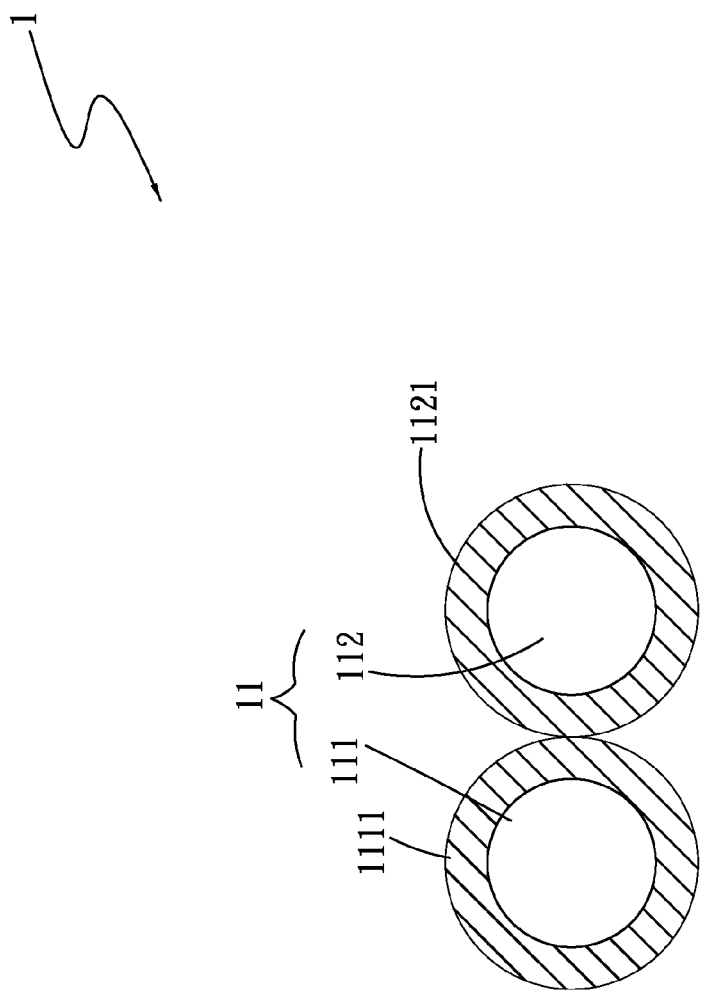
FIG. 1 is a cross sectional view of a transmission unit with reduced crosstalk signal according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Please refer to FIG. 1 that is a cross sectional view of a transmission unit with reduced crosstalk signal according to a first embodiment of the present invention. For the purpose of conciseness, the present invention is also briefly referred as a transmission unit and generally denoted by reference numeral 1 herein. As shown, in the first embodiment, the transmission unit 1 of the present invention includes a first conductor group 11.

The first conductor group 11 includes at least one first conductor 111 surrounded by a first sheath 1111 and at least one second conductor 112 surrounded by a second sheath 1121. The first and the second conductor 111, 112 are axially parallelly arranged side by side. The first sheath 1111 has a dielectric coefficient higher than that of the second sheath 1121.

The first conductor 111 is a signal conductor, and the second conductor 112 can be a signal conductor or an earth conductor.

Figure 2:
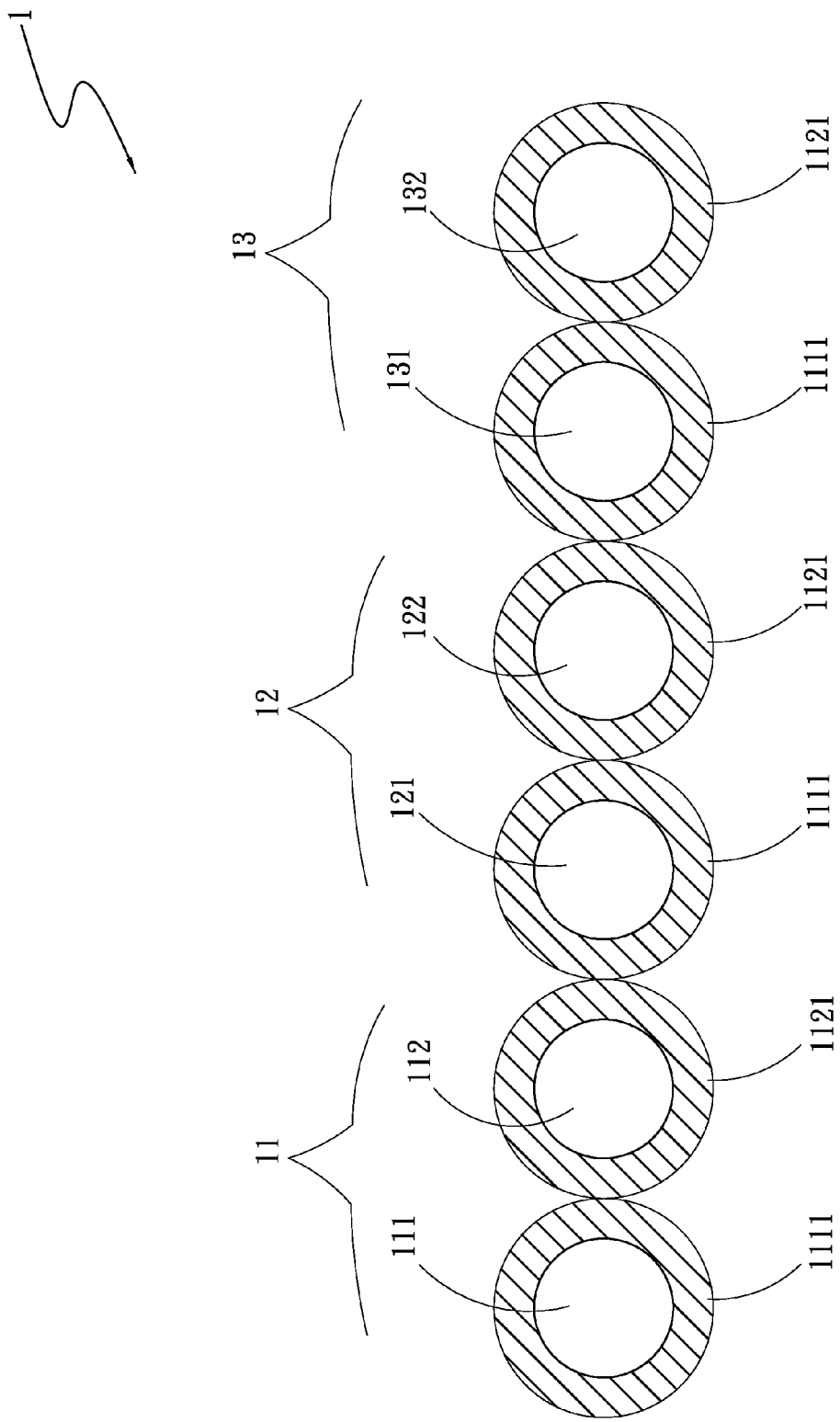
FIG. 2 is a cross sectional view of a transmission unit with reduced crosstalk signal according to a second embodiment of the present invention.

Please refer to FIG. 2 that is a cross sectional view of a transmission unit 1 according to a second embodiment of the present invention. As shown, in the second embodiment, the transmission unit 1 includes a first conductor group 11, a second conductor group 12 and a third conductor group 13. Since the first conductor group 11 is structurally similar to that in the first embodiment, it is not repeated described in details herein. The second conductor group 12 includes at least one third conductor 121 surrounded by a first sheath 1111 and at least one fourth conductor 122 surrounded by a second sheath 1121. The third conductor group 13 includes at least one fifth conductor 131 surrounded by a first sheath 1111 and at least one sixth conductor 132 surrounded by a second sheath 1121. In the second embodiment, the first, second and third conductor groups 11, 12, 13 can be differential signal pairs.

In the second embodiment, there is a difference between the dielectric values of the first sheath 1111 and the second sheath 1121. Since a high-dielectric material has good ability to concentrate electric field, the use of a low-dielectric material for one conductor in each of the signal pairs can reduce electric field concentration and accordingly, reduce crosstalk noise interference between the signal pairs.

Figure 3:
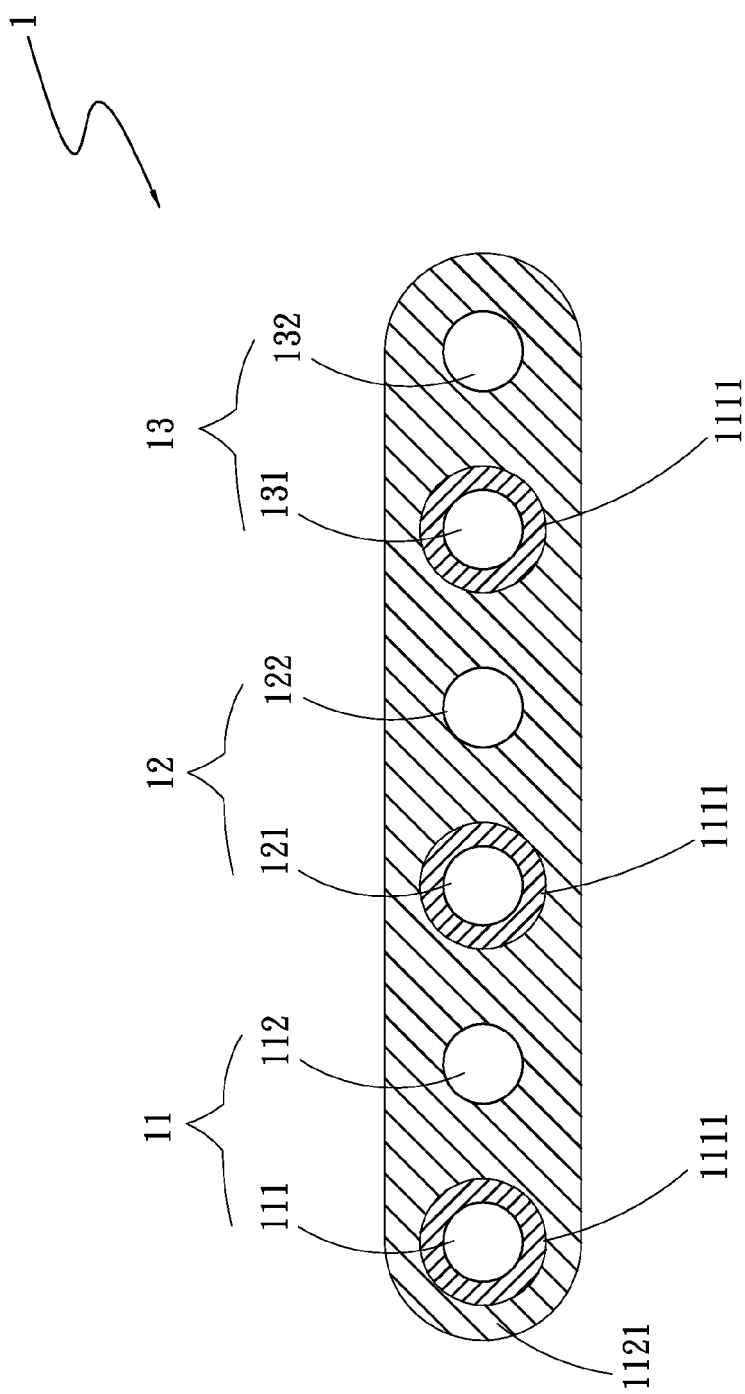
FIG. 3 is a cross sectional view of a transmission unit with reduced crosstalk signal according to a third embodiment of the present invention.

FIG. 3 is a cross sectional view of a transmission unit 1 according to a third embodiment of the present invention. As shown, in the third embodiment, the transmission unit 1 includes a first conductor group 11 having at least one first conductor 111 surrounded by a first sheath 1111 and at least one second conductor 112; a second conductor group 12 having at least one third conductor 121 surrounded by a first sheath 1111 and at least one fourth conductor 122; a third conductor group 13 having at least one fifth conductor 131 surrounded by a first sheath 1111 and at least one sixth conductor 132; and a second sheath 1121 surrounding all the first sheaths 1111 and the second, fourth and sixth conductors 112, 122, 132. In the third embodiment, the first, second and third conductor groups 11, 12, 13 may be differential signal pairs.

Figure 4:
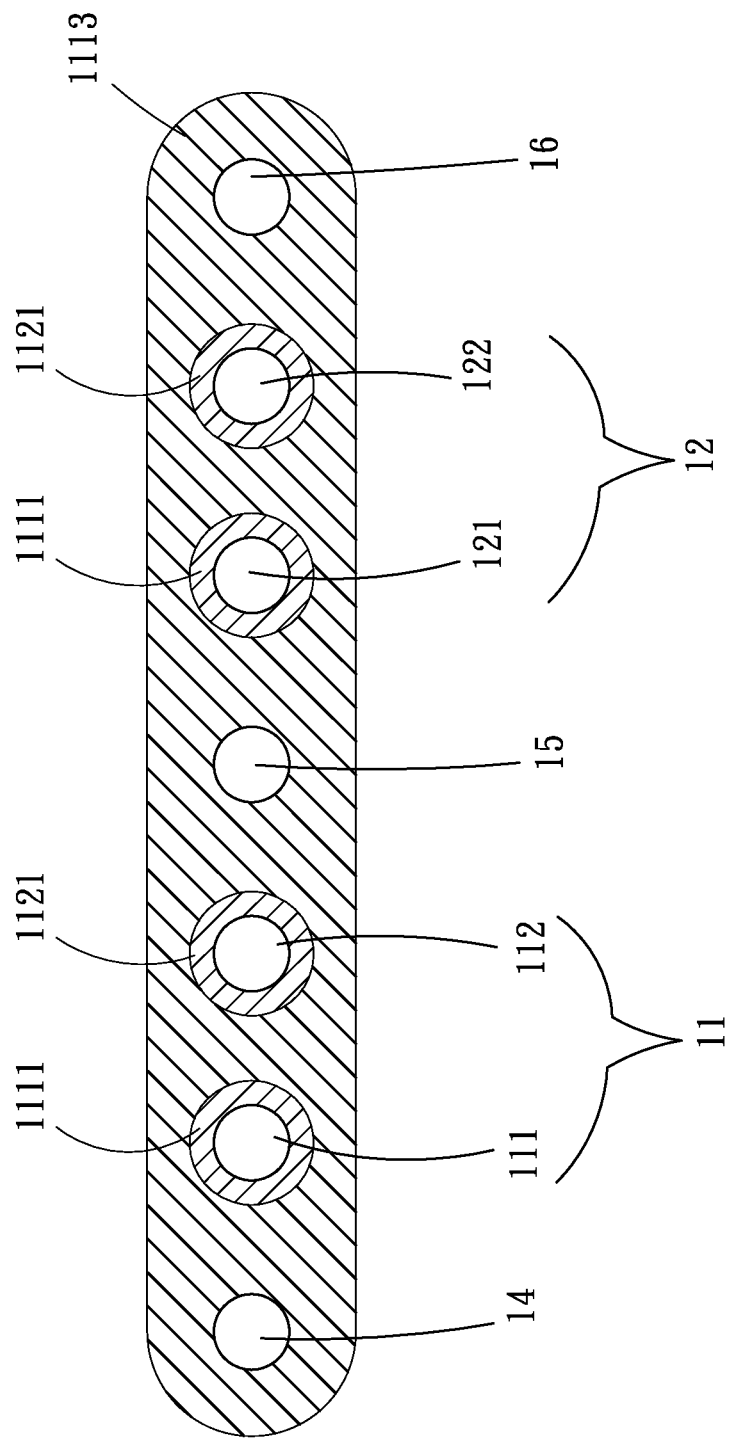
FIG. 4 is a cross sectional view of a transmission unit with reduced crosstalk signal according to a fourth embodiment of the present invention.

Please refer to FIG. 4 that is a cross sectional view of a transmission unit 1 according to a fourth embodiment of the present invention. As shown, in the fourth embodiment, the transmission unit 1 includes a first conductor group 1 having at least one first conductor 111 surrounded by a first sheath 1111 and at least one second conductor 112 surrounded by a second sheath 1121; a second conductor group 12 having at least one third conductor 121 surrounded by a first sheath 1111 and at least one fourth conductor 122 surrounded by a second sheath 1121; a first earth conductor 14; a second earth conductor 15; a third earth conductor 16; and a third sheath 1131. The first and second conductor groups 11, 12 can be differential signal pairs. The second earth conductor 15 is arranged between the first and the second conductor group 11, 12; the first earth conductor 14 is arranged to one side of the first conductor group 11 opposite to the second earth conductor 15; and the third earth conductor 16 is arranged to one side of the second conductor group 12 opposite to the second earth conductor 15. The third sheath 1113 surrounds all the first and second sheaths 1111, 1121 and the first, second and third earth conductors 14, 15, 16. The first and the second sheath 1111, 1121 may have the same dielectric coefficient, which is higher than that of the third sheath 1113.

In the fourth embodiment, the transmission unit 1 includes differential signal pairs and earth conductors. There is a difference between the dielectric values of the first and second sheaths 1111, 1121 and the third sheath 1113. Since a high-dielectric material has good ability to concentrate electric field, the use of a low-dielectric material for one conductor in each of the signal pairs can reduce electric field concentration and accordingly, reduce crosstalk noise interference between the signal pairs.

Figure 5:
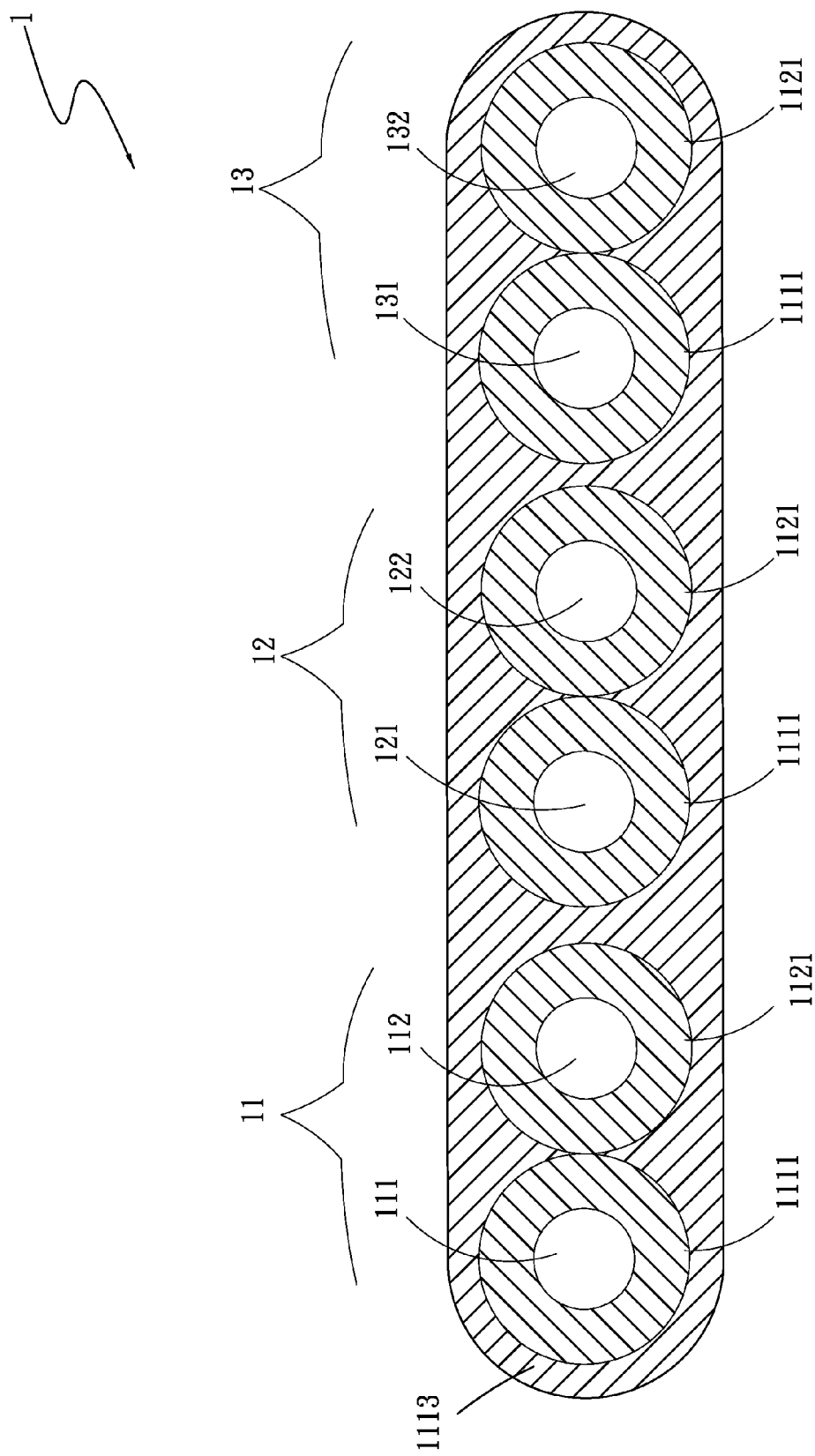
FIG. 5 is a cross sectional view of a transmission unit with reduced crosstalk signal according to a fifth embodiment of the present invention.

FIG. 5 is a cross sectional view of a transmission unit 1 according to a fifth embodiment of the present invention. As shown, in the fifth embodiment, the transmission unit 1 includes a first conductor group 11 having at least one first conductor 111 surrounded by a first sheath 1111 and at least one second conductor 112 surrounded by a second sheath 1121; a second conductor group 12 having at least one third conductor 121 surrounded by a first sheath 1111 and at least one fourth conductor 122 surrounded by a second sheath 1121; a third conductor group 13 having at least one fifth conductor 131 surrounded by a first sheath 1111 and at least one sixth conductor 132 surrounded by a second sheath 1121; and a third sheath 1113 surrounding all the first sheaths 1111 and second sheaths 1121. The first, second and third conductor groups 11, 12, 13 are single-ended signal pairs. All the first sheaths 1111 have a dielectric coefficient higher than that of the second sheaths 1121.

Alternatively, the transmission unit 1 in the fifth embodiment may include differential signal pairs without earth conductors. There are differences between the dielectric values of the first, the second and the third sheath 1111, 1121, 1113. Since a high-dielectric material has good ability to concentrate electric field, the use of a low-dielectric material for one conductor in each of the signal pairs can reduce electric field concentration and accordingly, reduce crosstalk noise interference between the signal pairs.

Figure 6:
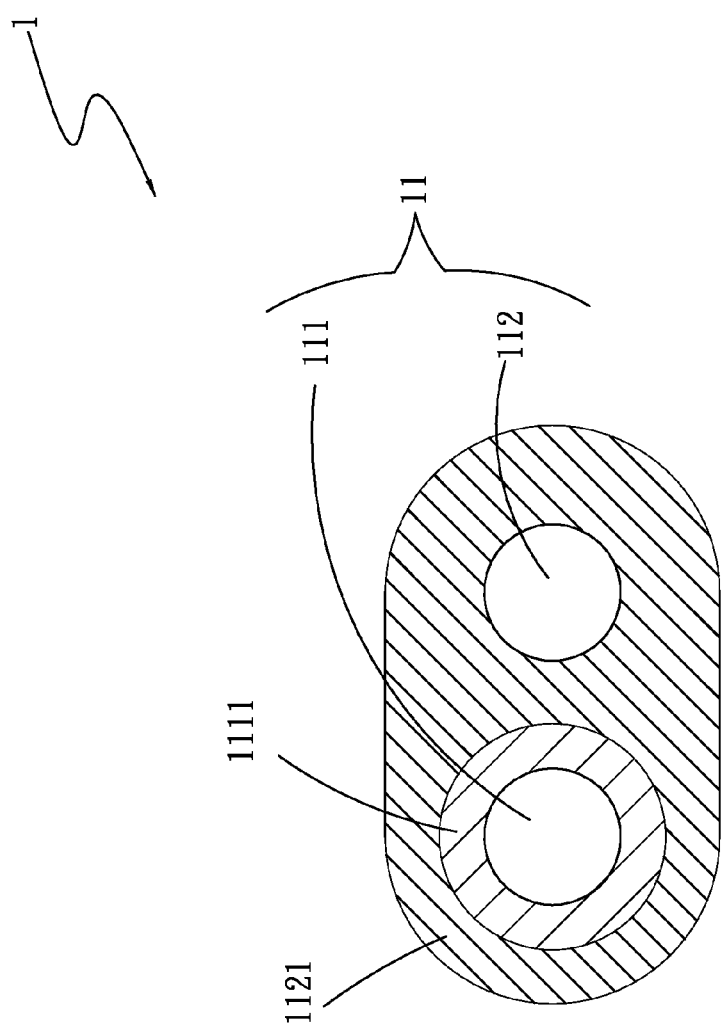
FIG. 6 is a cross sectional view of a transmission unit with reduced crosstalk signal according to a sixth embodiment of the present invention.

FIG. 6 is a cross sectional view of a transmission unit 1 according to a sixth embodiment of the present invention. As shown, in the sixth embodiment, the transmission unit 1 includes a first conductor group 11 having at least one first conductor 111 surrounded by a first sheath 1111 and at least one second conductor 112; and a second sheath 1121 surrounding the first sheath 1111 and the second conductor 112. The first and the second conductor 111, 112 are axially arranged corresponding to one another.

Figure 7:
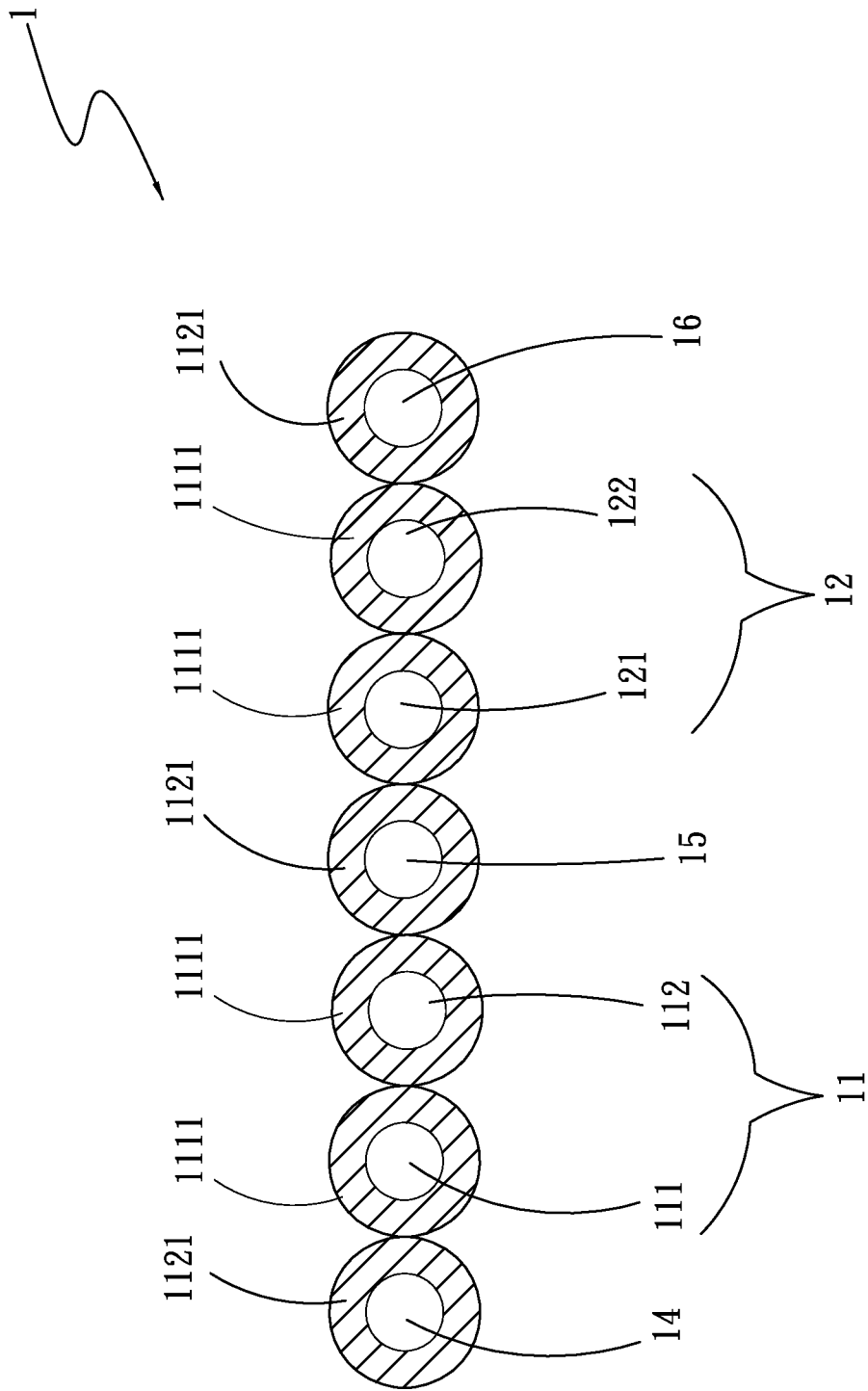
FIG. 7 is a cross sectional view of a transmission unit with reduced crosstalk signal according to a seventh embodiment of the present invention.

FIG. 7 is a cross sectional view of a transmission unit 1 according to a seventh embodiment of the present invention. As shown, in the seventh embodiment, the transmission unit 1 includes a first conductor group 11, a second conductor group 12, a first earth conductor 14, a second earth conductor 15, and a third earth conductor 16. The first conductor group 11 includes at least one first conductor 111 and at least one second conductor 112, which are respectively surrounded by a first sheath 1111; the second conductor group 12 includes at least one third conductor 121 and at least one fourth conductor 122, which are respectively surrounded by a first sheath 1111. The first and the second conductor group 11, 12 are differential signal pairs. The second earth conductor 15 is arranged between the first and the second conductor group 11, 12; the first earth conductor 14 is arranged to one side of the first conductor group 11 opposite to the second earth conductor 15; and the third earth conductor 16 is arranged to one side of the second conductor groups 12 opposite to the second earth conductor 15. The first, second and third earth conductors 14, 15, 16 are respectively surrounded by a second sheath 1121. The first sheaths 1111 have a dielectric coefficient higher than that of the second sheaths 1121.

In the seventh embodiment, the transmission unit 1 includes differential signal pairs and earth conductors. There is a difference between the dielectric values of the first sheaths 1111 and the second sheaths 1121. Since a high-dielectric material has good ability to concentrate electric field, the use of a low-dielectric material for one conductor in each of the signal pairs can reduce electric field concentration and accordingly, reduce crosstalk noise interference between the signal pairs.

Figure 8:
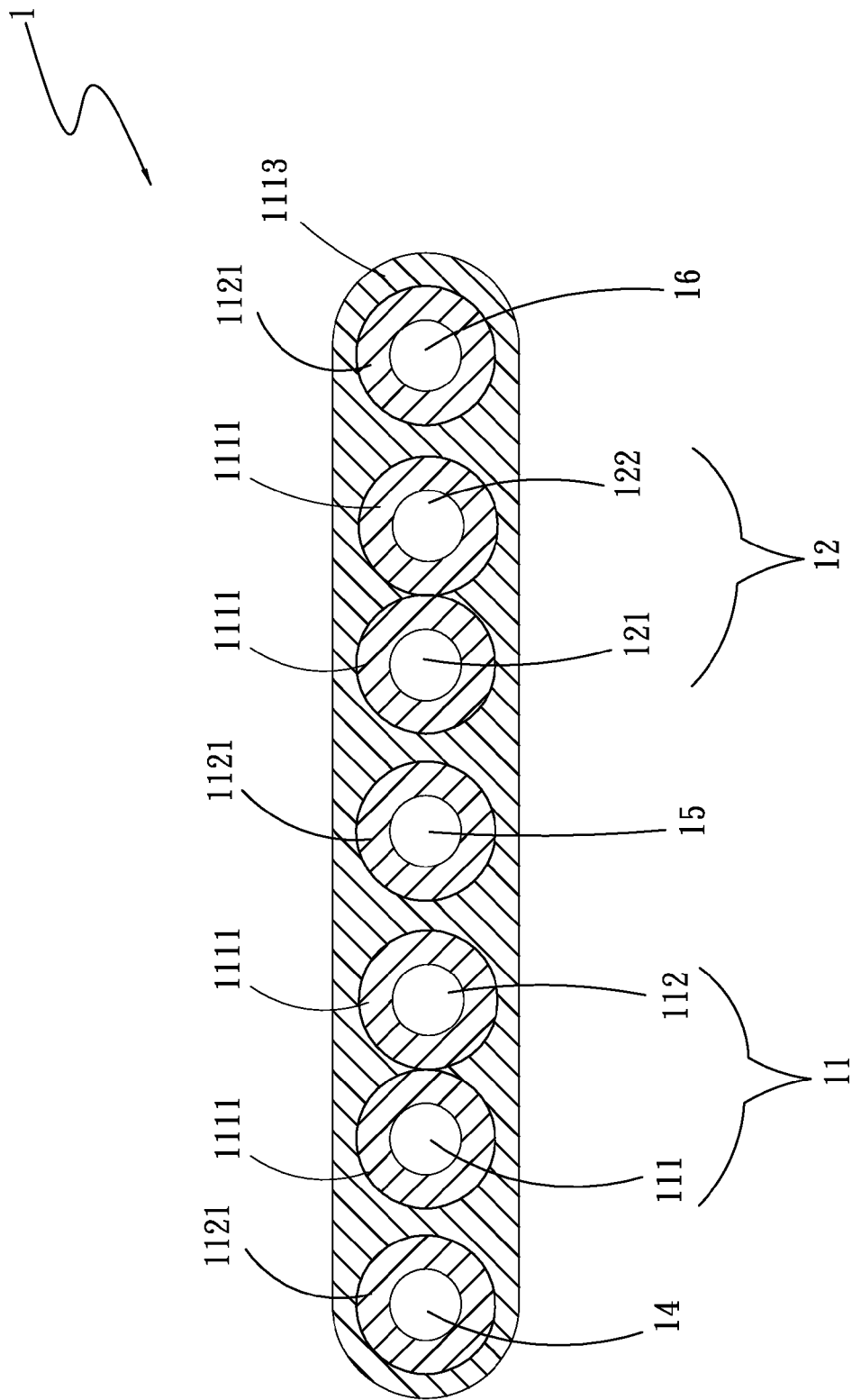
FIG. 8 is a cross sectional view of a transmission unit with reduced crosstalk signal according to an eighth embodiment of the present invention.

FIG. 8 is a cross sectional view of a transmission unit 1 according to an eighth embodiment of the present invention. As shown, the transmission unit 1 in the eighth embodiment is generally structurally similar to the seventh embodiment, except for a third sheath 1113 that surrounds all the first and second sheaths 1111, 1121.

In the eighth embodiment, the transmission unit 1 includes differential signal pairs and earth conductors. There are differences between the dielectric values of the first sheaths 1111, the second sheaths 1121, and the third sheaths 1113. Since a high-dielectric material has good ability to concentrate electric field, the use of a low-dielectric material for one conductor in each of the signal pairs can reduce electric field concentration and accordingly, reduce crosstalk noise interference between the signal pairs.

Figure 9:
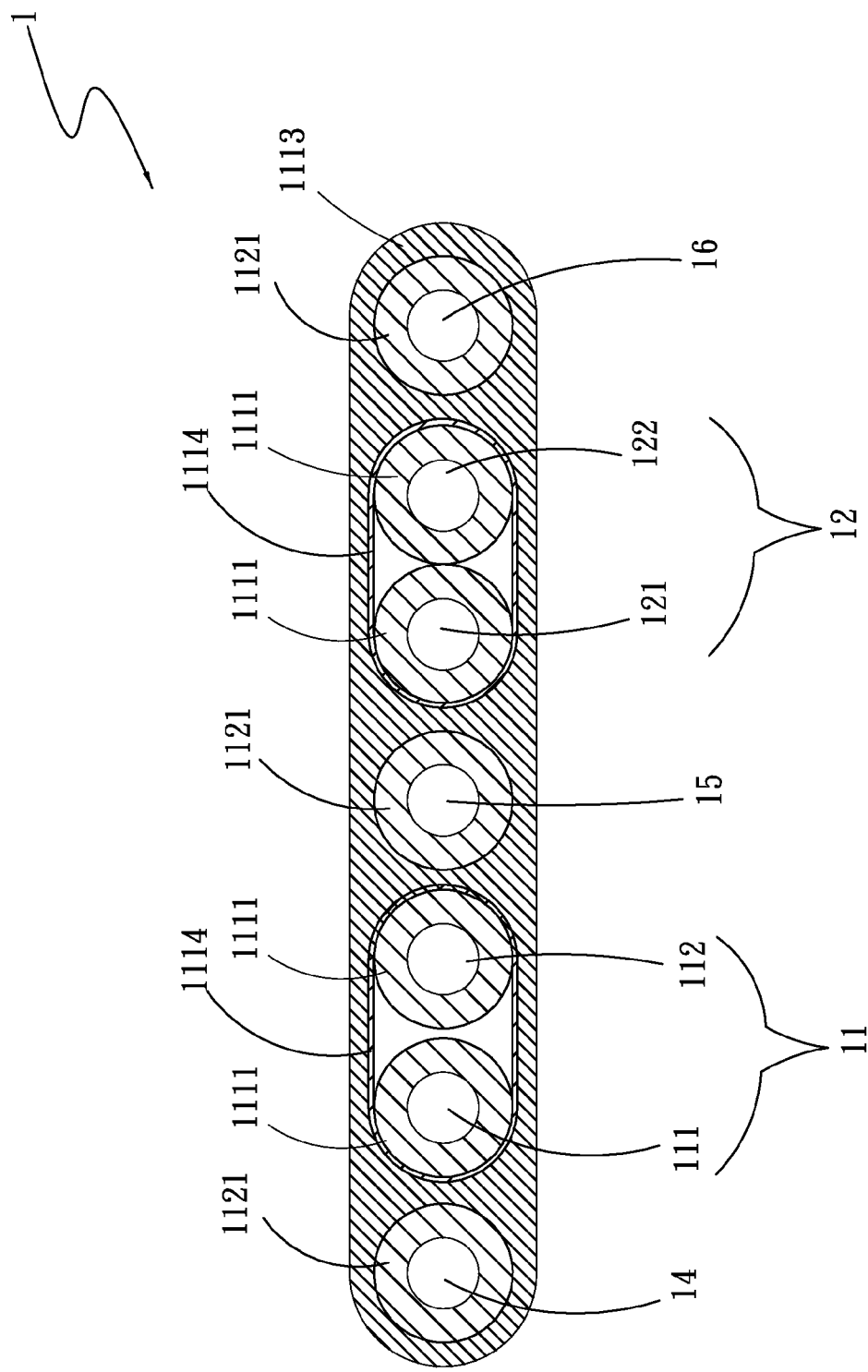
FIG. 9 is a cross sectional view of a transmission unit with reduced crosstalk signal according to a ninth embodiment of the present invention.

Please now refer to FIG. 9 is a cross sectional view of a transmission unit 1 according to a ninth embodiment of the present invention. As shown, the transmission unit 1 in the ninth embodiment is generally structurally similar to the eighth embodiment, except that the first and the second conductor group 11, 12 are respectively surrounded by a fourth sheath 1114 before being further surrounded by the third sheath 1113 along with the first, second and third earth conductors 14, 15, 16. The fourth sheath 1114 is aluminum foil in the ninth embodiment.

Figure 10:
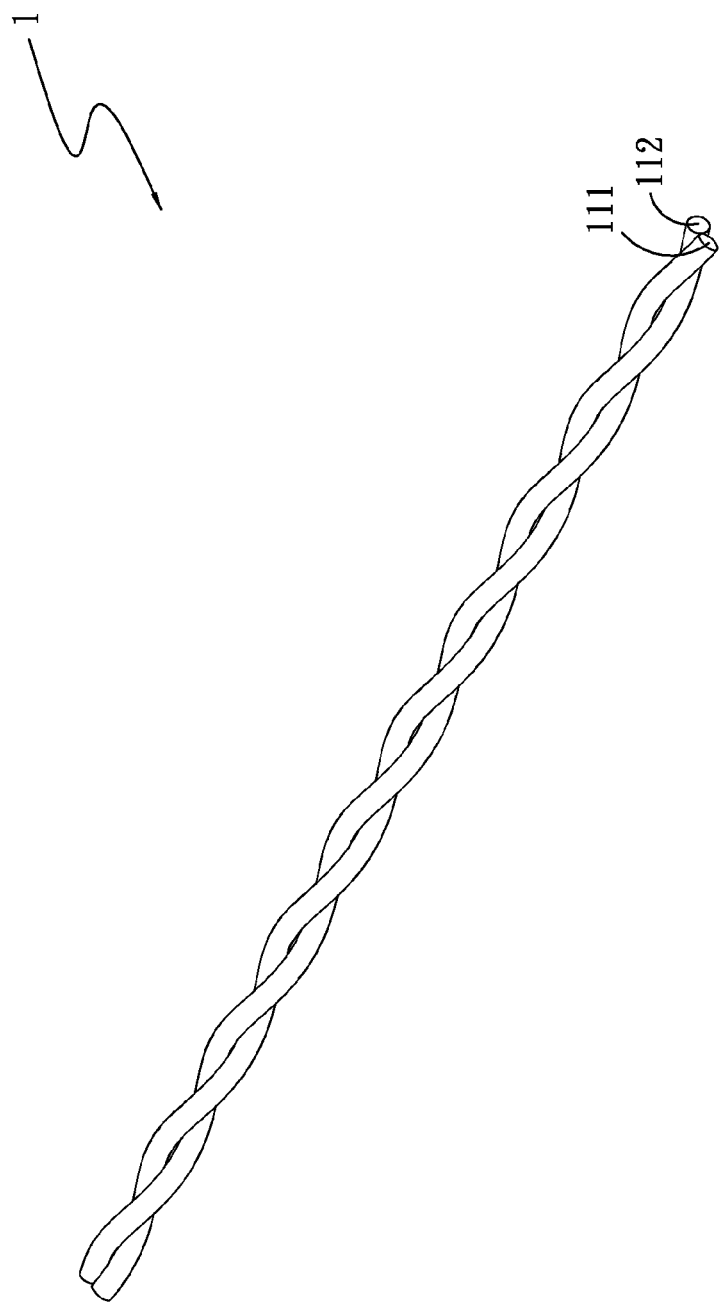
FIG. 10 is a perspective view of a transmission unit with reduced crosstalk signal according to a tenth embodiment of the present invention.

FIG. 10 is a perspective view of a transmission unit 1 according to a tenth embodiment of the present invention. As shown, the transmission unit 1 in the tenth embodiment is generally structurally similar to the first embodiment, except that the at least one first conductor 111 and the at least one second conductor 112 are twisted together in axial direction to form the first conductor group.

The transmission units according to different embodiments of the present invention are measured with a network analyzer (NA) under predetermined conditions, so as to find the influence of different combinations of the dielectric coefficients of the first and the second sheath 1111, 1121 on the signal transmission over the transmission units 1.

For example, several types of the transmission units 1 according to the seventh embodiment of the present invention are provided for measuring. Each type of the tested transmission units 1 according to the seventh embodiment has a different combination of the dielectric coefficients of the first sheaths 1111 and second sheaths 1121.

Figure 11:
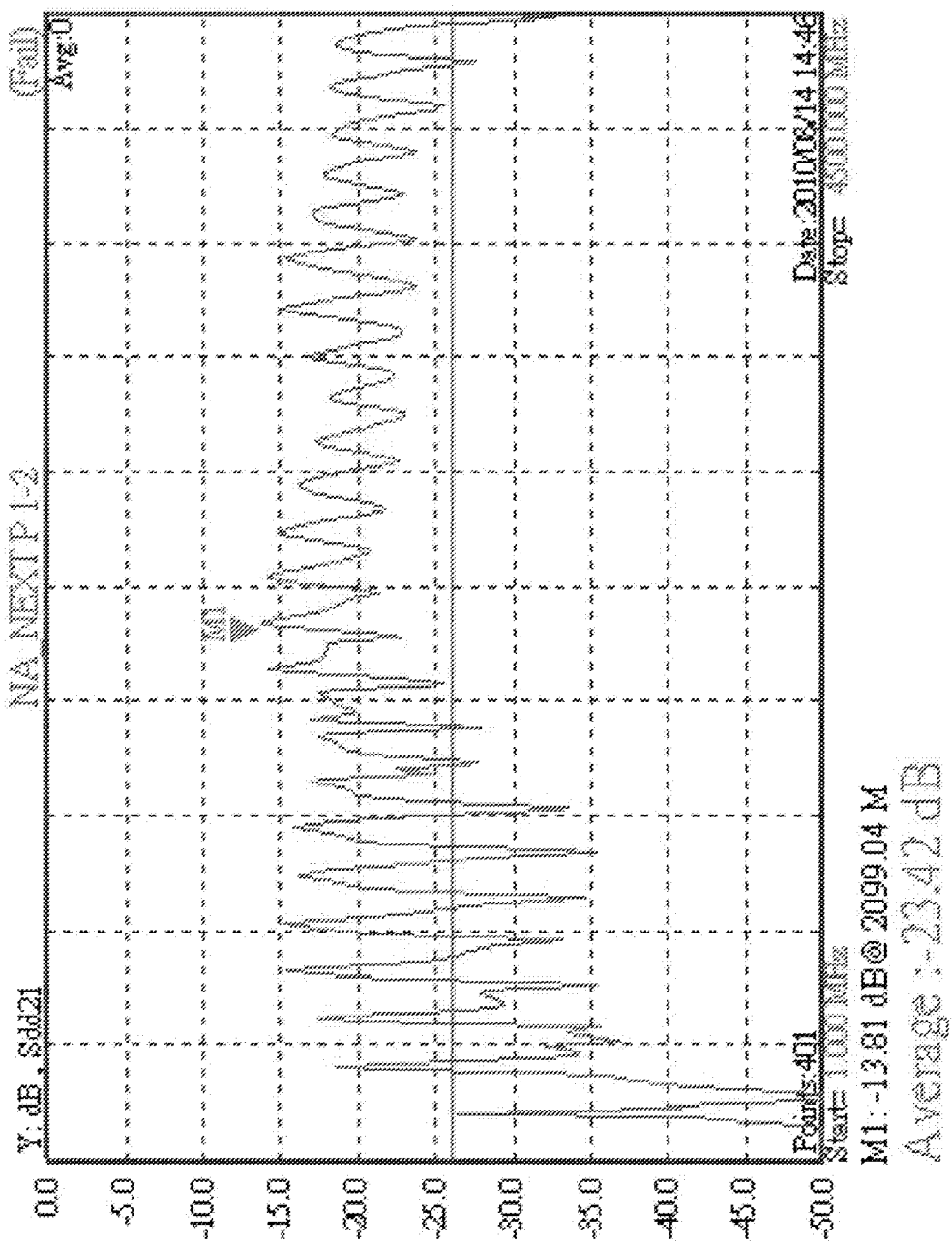
FIG. 11 is a chart showing the result from an electromagnetic test conducted on a type "A" transmission unit according to the seventh embodiment of the present invention.

Please refer to FIG. 11 that is a chart showing the result from an electromagnetic test conducted on a type "A" transmission unit 1 according to the seventh embodiment of the present invention, wherein the type "A" transmission unit 1 includes first and second sheaths 1111, 1121 both having a dielectric coefficient of 3.8.

Figure 12:
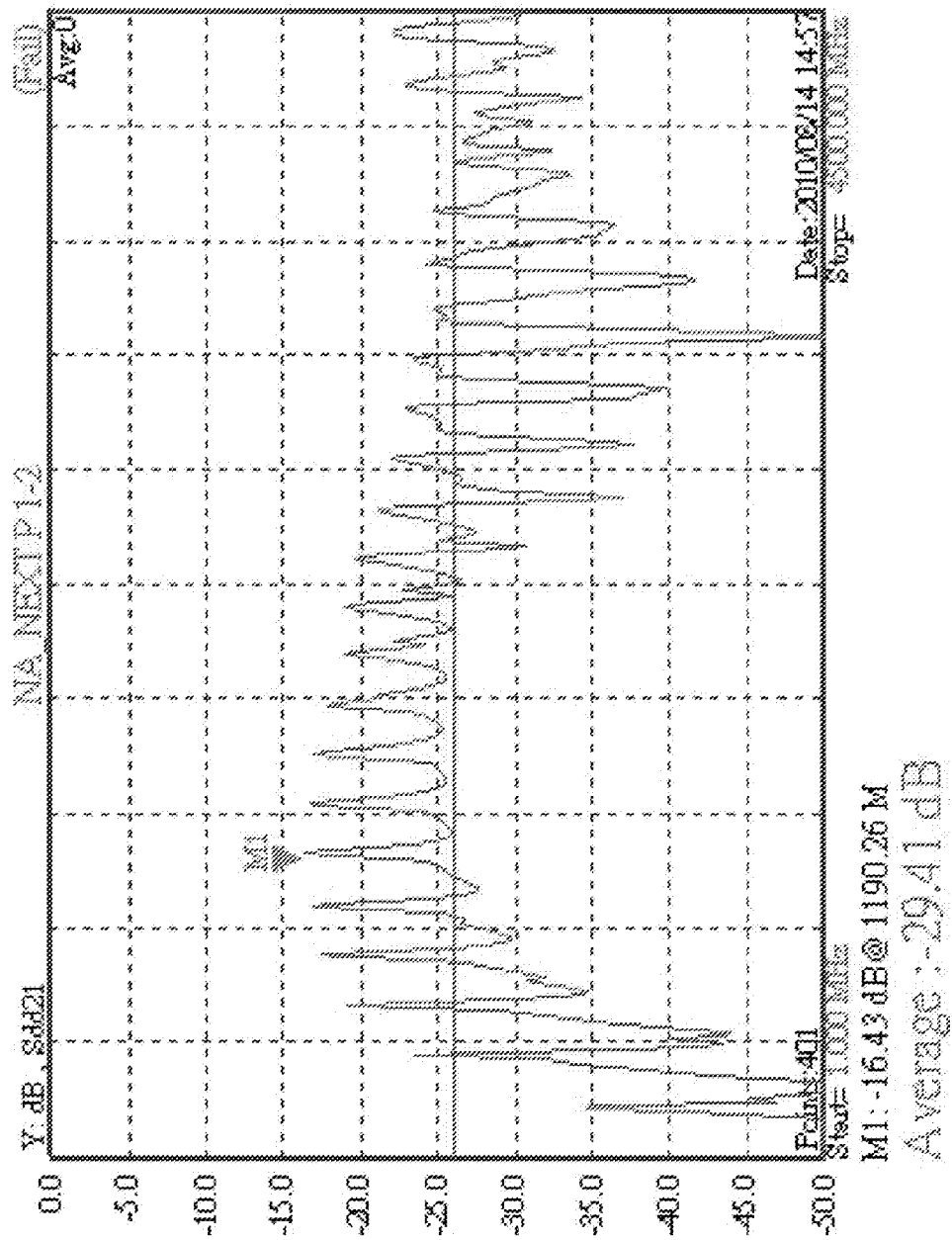
FIG. 12 is a chart showing the result from an electromagnetic test conducted on a type "B" transmission unit according to the seventh embodiment of the present invention.

FIG. 12 is a chart showing the result from an electromagnetic test conducted on a type "B" transmission unit 1 according to the seventh embodiment of the present invention, wherein the type "B" transmission unit 1 includes first sheaths 1111 having a dielectric coefficient of 3.2 and second sheath 1121 having a dielectric coefficient of 3.8.

Figure 13:
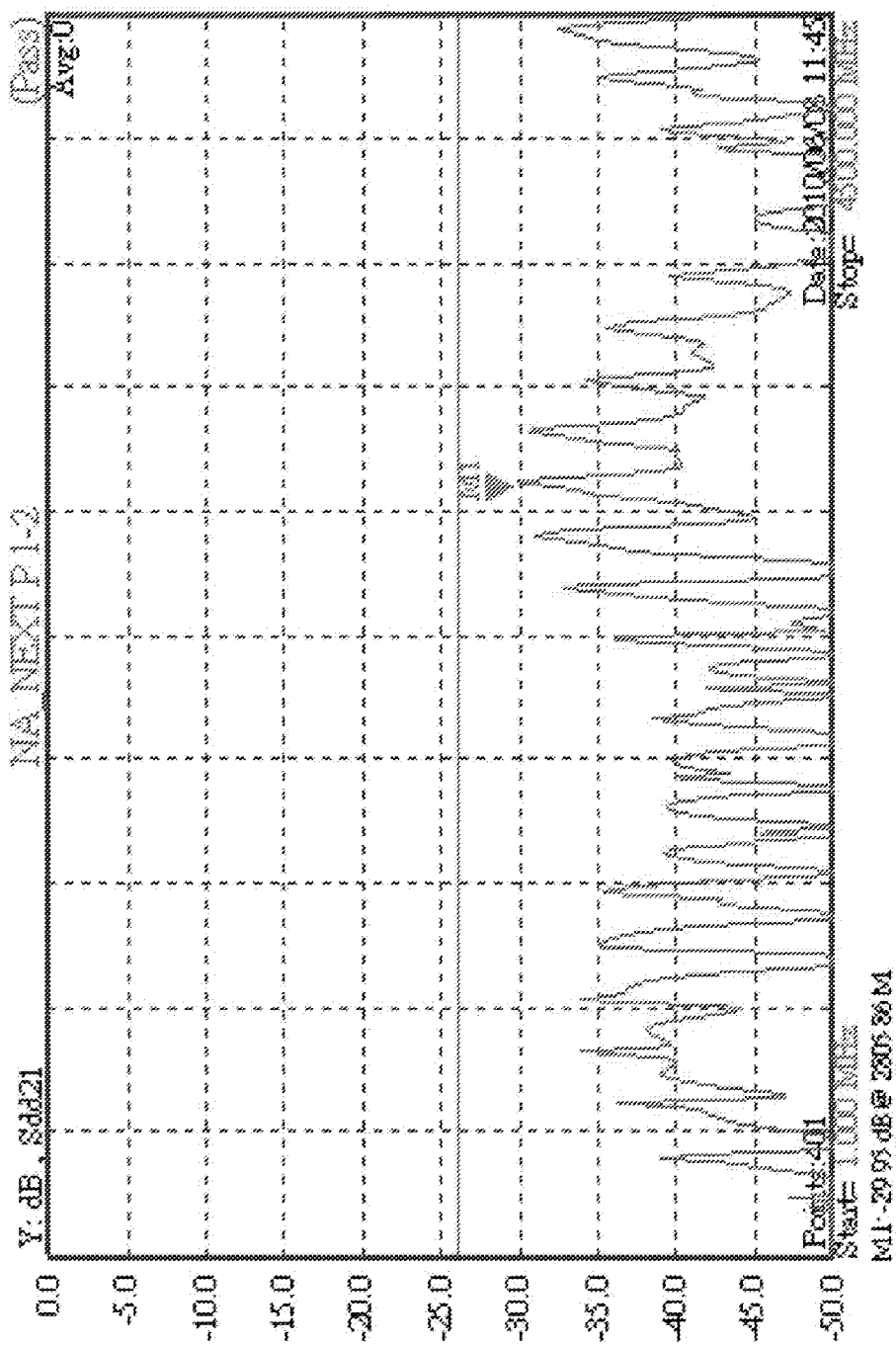
FIG. 13 is a chart showing the result from an electromagnetic test conducted on a type "C" transmission unit according to the seventh embodiment of the present invention.

FIG. 13 is a chart showing the result from an electromagnetic test conducted on a type "C" transmission unit 1 according to the seventh embodiment of the present invention, wherein the type "C" transmission unit 1 includes first sheaths 1111 having a dielectric coefficient of 3.8 and second sheath 1121 having a dielectric coefficient of 3.2.

Figure 14:
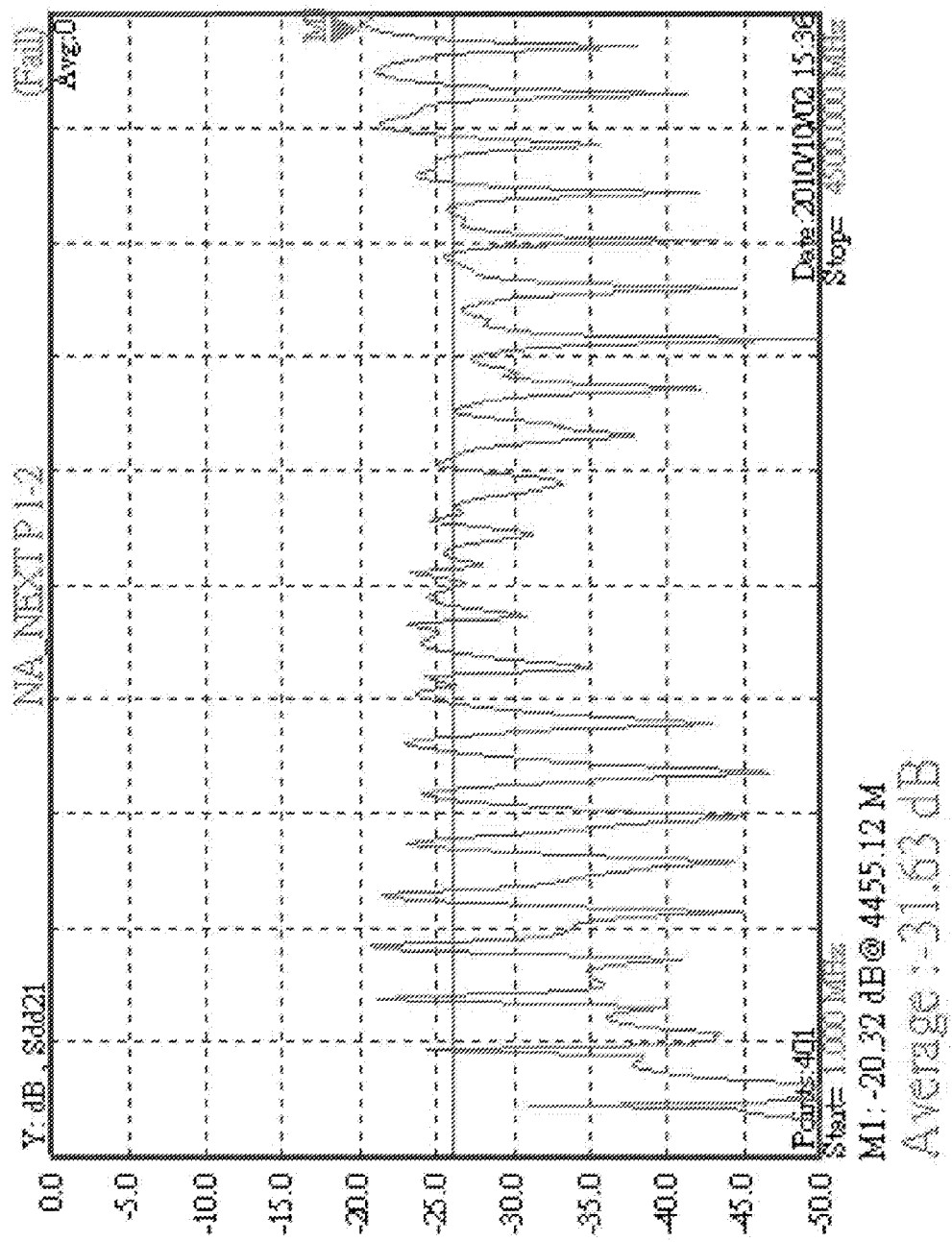
FIG. 14 is a chart showing the result from an electromagnetic test conducted on a type "D" transmission unit according to the seventh embodiment of the present invention.

FIG. 14 is a chart showing the result from an electromagnetic test conducted on a type "D" transmission unit 1 according to the seventh embodiment of the present invention, wherein the type "D" transmission unit 1 includes first and second sheaths 1111, 1121 both having a dielectric coefficient of 3.2.

The measured data are listed in Table 1 below.

TABLE 1

Influence of Different Combinations of Dielectric Coefficients On Signal Transmission

| Type | Worst Near-end Crosstalk (NEXT) Value (<−26 dB) | Frequency at Worst Crosstalk Value (MHz) | Result |
| --- | --- | --- | --- |
| A | −13.81 | 2099 | Fail |
| B | −16.43 | 1190 | Fail |
| C | −29.95 | 2805 | Pass |
| D | −20.32 | 4455 | Fail |

As can be seen from Table 1, the type "C" transmission unit according to the seventh embodiment of the present invention is proven in the electromagnetic test to show best data. In conclusion, when the signal transmission conductors in the transmission unit have sheaths with a dielectric coefficient higher than that of the sheaths for other conductors, the transmission unit can have effectively reduced crosstalk signal.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A transmission unit with reduced crosstalk signal, comprising a first conductor group; the first conductor group including at least one first conductor surrounded by a first sheath and at least one second conductor surrounded by a second sheath; the first and second conductors being axially arranged corresponding to one another; and the first sheath having a dielectric coefficient higher than that of the second sheath; wherein the first conductor is a signal conductor, and the second conductor is an earth conductor, the unit being a unitary structure free of ribbon conductive layers.

2. The transmission unit as claimed in claim 1, further comprising a second conductor group and a third conductor group; the second conductor group including at least one third conductor surrounded by a third sheath and at least one fourth conductor surrounded by a fourth sheath, and the third conductor group including at least one fifth conductor surrounded by a fifth sheath and at least one sixth conductor surrounded by a sixth sheath; wherein the third and fifth sheaths have the same dielectric coefficient of the first sheath, and the fourth and sixth sheaths has the same dielectric coefficient of the second sheath and the first, second and the third conductor groups are axially arranged side by side in parallel.

3. The transmission unit as claimed in claim 1, further comprising a second conductor group and a third conductor group; the second conductor group including at least one third conductor surrounded by a third sheath and at least one fourth conductor, and the third conductor group including at least one fifth conductor surrounded by a fourth sheath and at least one sixth conductor; wherein the third and fourth sheaths have the same dielectric coefficient of the first sheath and the second sheath surrounding the second conductor also surrounding the first sheath, the third sheath, the fourth sheath, the fourth conductor and the sixth conductor.

4. The transmission unit as claimed in claim 1, wherein the first and the second conductors are arranged side by side in parallel.

5. The transmission unit as claimed in claim 1, wherein the first and the second conductors are axially twisted together.

* * * * *